Oct. 16, 1956    R. D. GRAYSON    2,766,773
VALVE STRUCTURE
Filed Dec. 21, 1954    2 Sheets-Sheet 1

INVENTOR,
RICHARD D. GRAYSON
By John H. Rouse,
ATTORNEY.

Oct. 16, 1956  R. D. GRAYSON  2,766,773
VALVE STRUCTURE
Filed Dec. 21, 1954  2 Sheets-Sheet 2
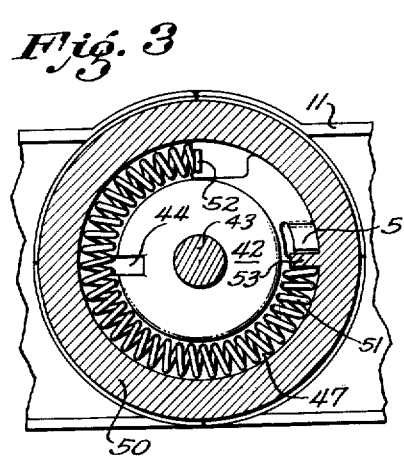
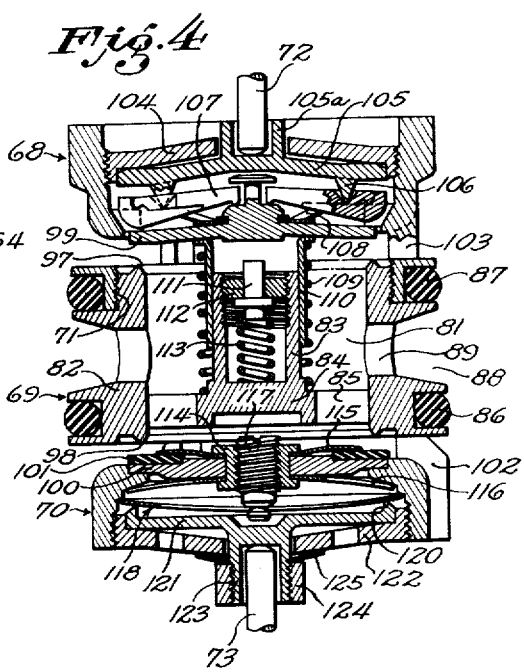
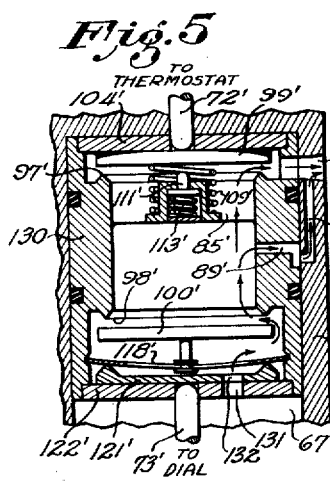
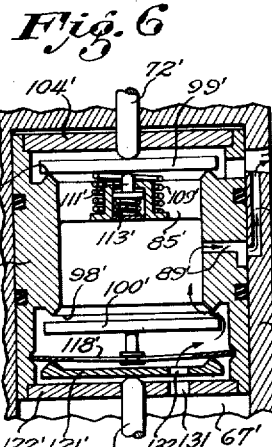
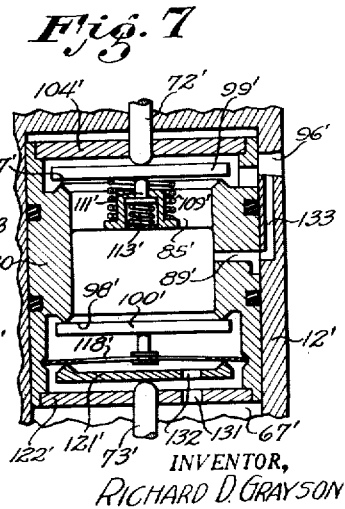
INVENTOR,
RICHARD D. GRAYSON
BY John H. Rouse,
ATTORNEY.

United States Patent Office 2,766,773
Patented Oct. 16, 1956

2,766,773

VALVE STRUCTURE

Richard D. Grayson, La Canada, Calif., assignor to General Controls Co., Glendale, Calif., a corporation of California Application December 21, 1954, Serial No. 476,633

19 Claims. (Cl. 137—630.22)

My present invention relates to valve structures of the type more particularly adapted for controlling supply of fuel gas to heating equipment and including thermostatically operated valve means for maintaining an even temperature in a space, such as a room or oven, heated by the equipment.

An object of this invention is to provide a thermostatically operated valve structure which includes a pair of valves interconnected in series to control flow of gas from an inlet to a main outlet, both of the valves being open when the space temperature is considerably lower than that desired so that a high-fire condition of the equipment-burner is established; the valves being arranged for sequential operation and so that with rise of space temperature the main-outlet one of the valves is closed and gas then passes from the inlet through a restricted outlet, provided between the valves, to produce a low-fire condition; continued rise of space temperature, if such should occur despite the low-fire, effecting closing of the inlet valve and thereby complete shut-off of the gas.

Another object of the invention is to provide a valve structure of the character described wherein the mainoutlet one of the valves is arranged to throttle or modulate the flow of gas, and the inlet valve is of the snap-action type.

Another object is to provide an arrangement whereby, in subsequent opening of the valves in response to fall of space temperature, the main-outlet one of the valves is partially opened before the inlet valve opens so that gas at relatively high rate (sufficient to ensure lighting of the burner) can pass through the partially-open mainoutlet valve, as well as through the restricted outlet, when the inlet valve opens.

For full understanding of the invention, and further appreciation of its objects and advantages, reference is to be had to the following detailed description and accompanying drawing, and to the appended claims.

In the drawing:

Figure 3 is a fragmentary section taken along the line 3—3 of Fig. 2, showing parts at the interior of dial 50;

Figure 4 is a longitudinal section, to enlarged scale, of the thermostatic valve assembly shown in elevation in Fig. 2; and Figures 5, 6 and 7 are diagrammatic views of the thermostatic valve, showing the parts in various positions assumed in operation.

Figure 1:
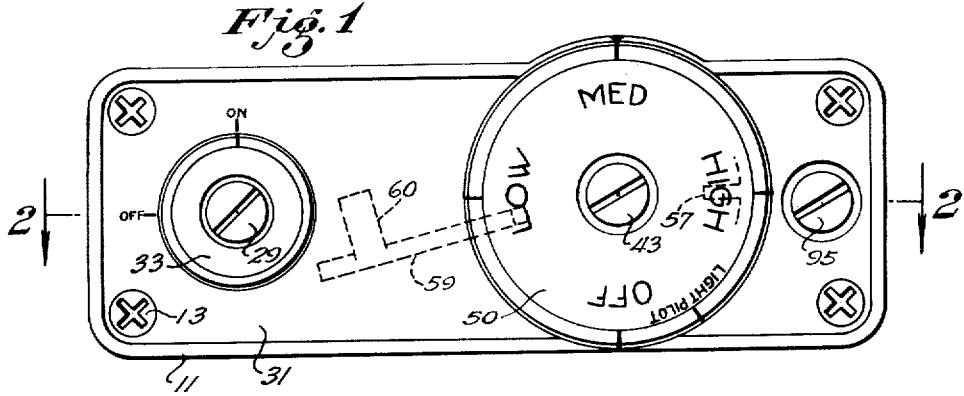
Figure 1 is a front elevation of a valve structure embodying this invention.

The particular valve structure shown, by way of example, in Figs. 1–4 of the drawing is adapted for controlling supply of gas to the burner of a domestic space-heater.

Figure 2:
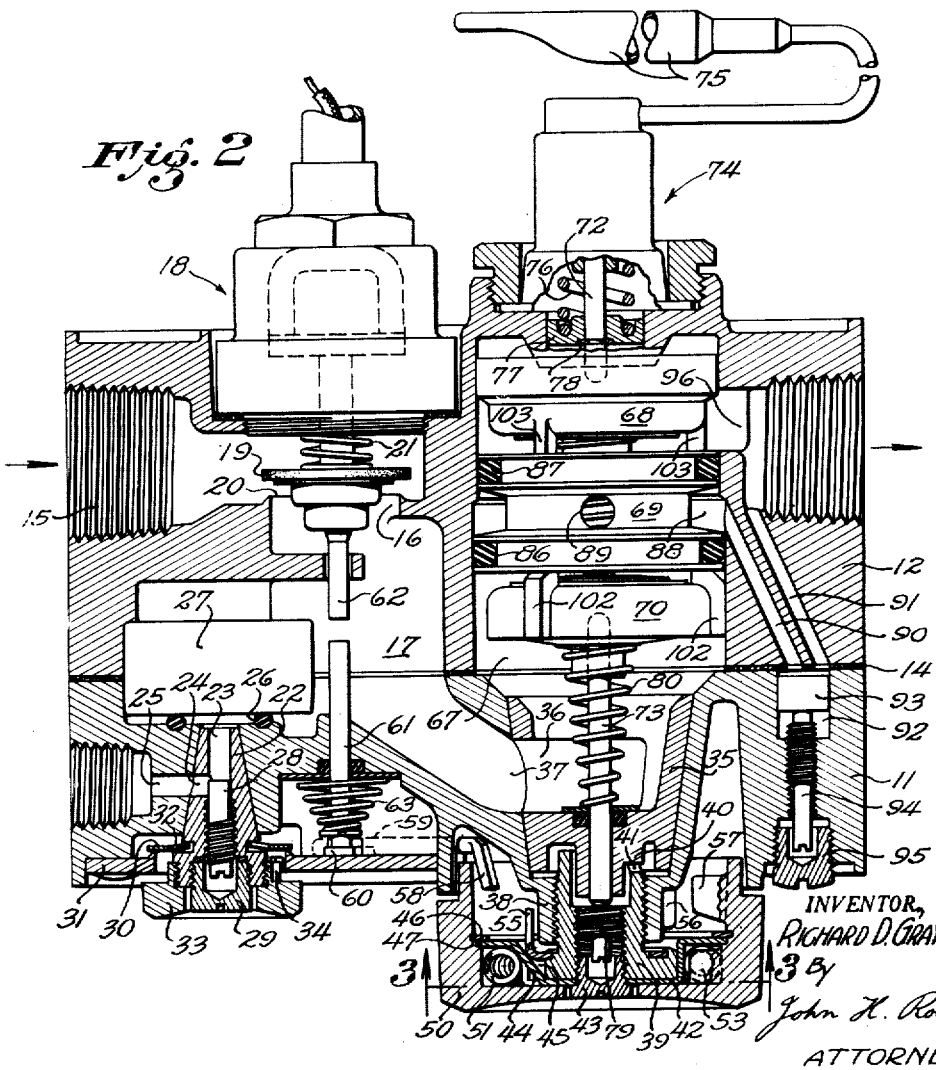
Figure 2 is a horizontal section taken along the line 2—2 of Fig. 1.

In Figs. 1–3 the numerals 11 and 12 indicate, respectively, the front and rear casing-sections of the valve structure, which are secured together by screws 13 (Fig. 1) with an apertured gasket 14 therebetween.

In the rear section 12 is an inlet opening 15 which communicates with a port 16 leading to an inlet chamber 17 formed in both sections of the structure. Flow through port 16 is controlled by an electromagnetic safety valve 18 of the conventional type adapted to be energized by current generated by a thermocouple heated by the flame of a pilot burner for igniting the main burner of the space heater. It is to be assumed that valve 18 is in its normal or energized condition wherein its closure 19 is raised out of engagement with the valve seat 20 around port 16. When valve 18 is deenergized, due to extinguishment of the pilot-burner flame, its closure 19 seats under the force of spring 21; it then being necessary to reset or reopen the valve manually in a manner to be described.

At the left of the valve structure is a pilot-burner valve comprising a tapered plug 22 rotatable in a conforming socket through the front section 11, the plug having an axial passage 23 communicating at its inner end with the inlet chamber 17, and a branch passage 24 registrable with a passage 25 which is enlarged and threaded at its outer end for attachment of a pilot-burner supply pipe. Within a cavity common to the sections, and seated on a sealing ring 26 around the inner end of the plug, is a capsule 27 containing material for filtering the gas passing to the pilot burner. Rate of flow to the pilot burner can be adjusted by a pin 28 threaded in passage 23 and covered at its outer end by a threaded cap 29. Plug 22 is maintained seated by a sheet-metal spring 30 bearing against a plate 31, covering the front of the structure at its left, and having fingers 32 extending into a groove around the plug. The front end of plug 22 projects through an opening in plate 31 and is provided with a knob 33, tightly threaded on the plug, having a lug 34 cooperating with stops on plate 31 for limiting rotation of the plug between its On and Off positions indicated in Fig. 1. The pilot-burner valve is normally open as shown and is closed, usually, only during the season when no space-heating is required.

Toward its right, the front section of the structure is formed to provide a tapered socket for a correspondingly tapered valve plug 35 which is recessed at its inwardly-facing larger-diameter end and has a side opening 36 communicating with the recess. Opening 36 extends more than halfway around the plug and is in communication with the adjoining circular end 37 of inlet chamber 17 in all operative positions of the plug other than when it is in and adjacent its Off position at 180° from its position as shown.

On the outside of the front section of the structure, coaxial with plug 35, is a cylindrical boss 38 having a central through-opening wherein a hollow screw 39 is threaded. On the front end of plug 35 is a boss having a projecting lug 40 which fits in a notch 41 cut in the inner end of screw 39 to provide a positive driving connection between the screw and the plug. Fitting snugly around the outer end or head of screw 39 is a cupped member 42, of sheet metal, which is fastened to screw 39 at its center by a small screw 43; relative rotation of screw 39 and member 42 being prevented by a narrow struck-in portion 44 of the member fitting a slot 45 in the screw-head.

Around the cupped member 42, and mounted thereon by means of a snap-ring 46 cooperating with the flange portion 47 of the member, is a cup-shaped dial 50. Relative rotation of dial 50 and member 42, 47 is normally prevented by a helical spring 51 in the annular space between member 42, 47 and the side wall of the dial. As is best seen in Fig. 3, spring 51 is compressed between a struck-up portion 52 of flange 47 and a lug 53 projecting inwardly from the side wall of dial 50; another struck-up portion of the flange being normally in abutment with lug 53 under the force of the spring.

Counterclockwise rotation of the dial effects, through lug 53 and flange-portion 54, direct rotation of member 42, 47 and the parts (screw 39 and plug 35) connected thereto. Spring 51 is sufficiently stiff that it does not yield when the dial is rotated in the opposite or clockwise direction, and direct rotation of the parts is effected until, at 180° from the position shown in the drawing, farther clockwise rotation of screw 39 (and of member 42, 47 and plug 35) is prevented when a bent-up finger 55 of a washer rigidly secured to screw 39 engages a lug 56 projecting integrally from boss 38. The plug is then in its closed or Off position.

Forced rotation of dial 50 farther in clockwise direction effects compression of spring 51 and engagement of a lug 57, projecting inwardly from the side wall of the dial, with an arm 58 on one end of a rod 59 which lies in a recess in the outer surface of the front section and is confined therein by plate 31. Projecting laterally from rod 59 adjacent its other end is a flat finger 60 which extends between plate 31 and the front end of a rod 61 which extends, sealingly, through an opening in the front section in alignment with an extension 62 of the safety valve 18 and is biased frontwards by a spring 63. Continued rotation of the dial (against the force of spring 51) effects turning of rod 59 and, through finger 60, rearward movement of rod 61 to effect resetting of the safety valve 18 in the event that it was then in its released or shut-off position. The dial is then in the position indicated by the legend "Light Pilot" in Fig. 1 and is maintained in that position while the gas flowing to the pilot burner (only, the main valve plug 35 being closed) is lit, and for an interval thereafter sufficient to effect retention of the safety valve in open position. When, after the resetting operation has been completed, the dial is released it returns to its Off position under the force of spring 51.

In the rear section 12 is a cylindrical cavity 67 (of slightly reduced diameter toward its rear) coaxial with valve plug 35 and sealingly communicating with the recess therein. Slidably fitting in cavity 67 is a thermostatically operable valve assembly shown per se in Fig. 4 and comprising a rear part 68, a middle part 69 and a front part 70. The parts 68 and 69 are threadedly interconnected at 71, while the front part is merely in abutting relation to part 69 but could be rigidly connected thereto since the parts 68, 69 and 70 remain in fixed relation to each other during operation of the valve assembly.

The assembly 68–70 is supported or positioned in cavity 67 between a pair of opposing stems 72 and 73. Stem 72 is the operating member of a thermostatic motor 74 which comprises a thermal bulb 75 arranged to respond to the temperature of the space heated under the control of the valve structure, motor 74, 75 being of the conventional type containing a fill of thermally expansible liquid and operating on stem 72 through an override spring 76 connected to the stem by a collar 77 and snap-ring 78. The arrangement is such that with rise and fall of space temperature corresponding inward and outward movement of stem 72 is effected.

The other stem 73 extends, sealingly, through an opening in the front end of valve plug 35 and abuts an adjusting screw 79 threaded in the hollow screw 39 connected to dial 50. By means of screw 79 the dial-operated stem 73 can be adjusted relative to the thermostatically-operated stem 72 so that the valve assembly 68–70 functions (in a manner to be described) to maintain a high, medium or low space-temperature corresponding to the legends shown on the dial in Fig. 1. Compressed between plug 35 and assembly 68–70 is a spring 80 whose function is to maintain the plug seated. The force applied to assembly 68–70 by spring 80 is substantially constant and can be ignored in connection with the operation of the assembly to be described.

Referring now more particularly to the valve assembly as shown in Fig. 4, the middle part 69 has an annular channel 81 between its side wall 82 and a hollow central portion 83 which is joined at its front end to the side wall by a web 84 having a plurality of openings 85 therethrough. Adjacent its front the part 69 has a circumferential groove wherein is disposed a sealing ring 86 of rubber-like material, there being a similar ring 87 in a groove defined by shouldered portions of parts 68 and 69 at their junction. In the periphery of part 69 between the sealing rings 86, 97 is a tapered groove 88 which is in communication with channel 81 by way of openings 89 through wall 82.

Referring briefly to Fig. 2, in the right side-wall of cavity 67 is a pair of slanting passages 90 and 91 which communicate with a cylindrical recess 92 in the rear surface of the front section 11. Fitting in this recess is a plug 93 carried by a screw 94 which extends to the front of the structure and is there covered by a screw fitting 95. The inner ends of passages 90 and 91 communicate, respectively, with groove 88 of valve assembly 68–70 and with a main outlet opening 96 in the rear section of the structure. Passages 90, 91 constitute a restricted outlet, the rate of flow through which can be varied by adjustment of plug 93.

Referring again to Fig. 4, the middle part 69 of the valve assembly has around the ends of its channel 81 a pair of oppositely-facing circular valve seats 97 and 98 which cooperate with a pair of disk-like closures 99 and 100 mounted on the rear and front parts of the assembly, closure 100 carrying a soft facing 101 of rubber or the like.

The front part 70 of the valve assembly has a set of three spaced guide projections 102 slidably fitting the wall of cavity 67, the remainder of the periphery of part 70 being of reduced diameter so that fluid can flow past it and across seat 98 into channel 81 when closure 100, 101 is in its open position as shown. The inner ends of projections 102 extend rearwardly beyond the central portion of part 70 and thus serve to space that portion from part 69 along the axis of the assembly.

In like manner, the central portion of the rear part 68 is spaced from part 69 along the axis of the assembly by a set of three spaced-apart projections 103 of the smaller-diameter inner end of part 68 so that, when closure 99 is in its open position as shown, fluid can flow from channel 81 past seat 97 and around and between projections 103 to the main outlet 96.

When the main-outlet valve constituted by seat 97 and closure 99 is closed, and the inlet valve constituted by seat 98 and closure 100, 101 is open, fluid can flow from cavity 67 only to the restricted outlet 90, 91. It is apparent that when inlet valve 98, 100, 101 is closed flow through the valve assembly 68–70 is fully obstructed, regardless of the condition of valve 97, 99.

Within the rear part 68 of the valve assembly, and confined therein by a centrally-apertured threaded plate 104, is a disk 105 having a pair of diametrically-opposed V-shaped projections 106 which bear in notches in a pair of like arms 107. These arms are fulcrumed at their outer ends on part 68 and are arranged so that their inner ends bear on the thickened central part of closure 99, the arms being urged to rock in a direction away from the closure by resilient fingers 108 attached to the closure. On the back of disk 105 is a boss 105a having a recess for receiving the end of stem 72 of the thermostatic motor 74, 75.

Closure 99 is biased to open position by the force of a spring 109 acting on the closure through a sleeve 110 around the central portion 83 of part 69. Within the hollow of portion 83 is a shouldered pin 111 whose tip projects through an apertured retaining plug 112 in a direction toward closure 99 and is biased in that direction by the force of a spring 113. Pin 111 is arranged so that its tip engages closure 99 only when the same is spaced by a minute distance from seat 97. The purpose of the spring-loaded pin 111 will be described hereinafter in connection with the operation of the valve assembly.

Referring now to the front part 70, closure 100, 101 has a central opening wherein a flanged nut 114 is secured by riveting. Attached to the closure by the flange of nut 114 is a thin disk 115 which serves to hold the rubber facing or washer 101 in place. On the opposite side of the closure and attached thereto by the riveted-over part of nut 114 is a light retaining spring 116, of thin sheet metal, whose chief function is to eliminate lost-motion in the connection between the closure and the snap-spring described in the next sentence. Inside of part 70, and connected at its center to closure 100, 101 by means of a grooved screw 117 threaded in nut 114, is a cupped and apertured snap-spring 118 which is supported at its periphery on a shoulder in part 70 and is engaged adjacent its periphery by a circular knife-edge 120 raised from a disk 121. Spring 118 is of the conventional type adapted to snap over-center when force is applied to it through disk 121, and to snap back to normal shape when the force is then reduced. Disk 121 is confined by a centrally-apertured plate 122, threaded in the front end of part 70, and has a central boss 123 which is recessed to receive the stem 73 connected to dial 50 and adjustable by rotation thereof.

Around boss 123, and backed by a nut 124 threaded on the boss, is a cupped spring washer 125 urging disk 121 frontwards toward plate 122. Adjustment of nut 124 effects variation of the force of spring 125 and thereby variation of the force under which snapping of valve-actuating spring 118 will occur.

The operation of the valve assembly 68–70 can be more readily understood by reference to the equivalent diagrammatic showing of the assembly in Figs. 5–7. In these diagrams the side portions of the three parts of the assembly are united to form a hollow cylindrical body 130. The various elements at the interior of this body have been assigned the same numerals as those of the corresponding elements in Fig. 4 but with a prime mark added.

In Fig. 5 (wherein the flow conditions are the same as in Fig. 4) both of the closures 99' and 100' are fully open so that fluid can pass, as indicated by the flow arrows, across valve-seats 97' and 98' to the main outlet 96', as well as through side-opening 89' to the restricted outlet indicated by numeral 133 and corresponding to the passages 90, 91 in Fig. 2. In the diagrams the path of flow from cavity 67' (which communicates with the inlet chamber 17 by way of the open valve plug 35) is shown as being through aligned openings 131 and 132 in plate 122' and disk 121', and the apertures of snap-spring 118'. For the sake of simplicity of the thermostat stem 72' is shown as acting directly on closure 99' instead of through a leverage system as in Fig. 4. The leverage system 105—107 of Fig. 4 is required only when magnification of movement of closure 99' is desired, as in connection with the control of room temperature within a narrow range.

When, in response to rise of room temperature, stem 72' moves inwardly from its position as shown in Fig. 5 closure 99' is brought gradually closer to seat 97' and the rate of flow of gas through valve 97', 99' progressively reduced. When closure 99' is within a minute distance from its seat it engages the spring-loaded pin 111', but this does not appreciably effect continued movement of the closure under the force produced by the thermostat (which is of the liquid-filled type) so that the closure finally seats. The valve assembly is then in the condition shown in Fig. 6 wherein flow is only through the restricted outlet 133 whose capacity is such that a predetermined low-fire condition of the burner is established.

It will be observed that, as shown in Fig. 6, the body 130 has moved slightly forward due to the compression of springs 109' and 113', this movement of the body being opposed by the superior force of snap-spring 118' which has now assumed a somewhat flatter shape.

Under cold-weather conditions the controlling movements of thermostat stem 72' are usually such that the valve assembly modulates between its low-fire and high-fire positions shown in Figs. 6 and 5. But when the weather is mild and the heat produced by the low-fire is sometimes in excess of that required, the burner is shut off completely. This is effected by continued forward movement of body 130 (from its position in Fig. 6) under the force applied to it by the thermostat through stem 72', closure 99' and seat 97'.

When this movement of the body has progressed far enough to bring snap-spring 118' (which is backed by the stationary dial-stem 73' and disk 121') just beyond its dead-center position, spring 118' snaps over-center, moving closure 100' into engagement with its seat 98'; the conditions then being generally as shown in Fig. 7 (but with closure 99' somewhat closer to its seat 97').

Immediately after valve 98', 100' has snapped closed, the closure 99' is no longer seated but is in engagement with the spring-loaded pin 111' which is in partially projected position because of follow-through forward movement of body 130 when the snap occurred. This condition is due to the relative forces of springs 109' and 113' and snap-spring 118'.

In an actual embodiment of the invention, substantially identical with the structure shown in Figs. 1–4, the force or "poundage" of spring 109 is 4# and that of spring 113 is 12#, while spring 118 is arranged so that it snaps over-center when the force applied to disk 121 is 20#, and snaps back to normal shape when this force is reduced to 7#.

Assigning the same values to the corresponding springs in the diagrams, it will be seen that when the closure 99' is seated, as shown in Fig. 6, the force applied to body 130 is 16# (4#+12#). When this force is increased to 20# spring 118' snaps over-center. However, the force exerted on the body by the snap-spring after it has been snapped is substantially less than the opposing force (4#+12#) of springs 109' and 113' so that the body moves forward and assumes a position wherein pin 111' is partially projected and in engagement with closure 99', the force then exerted on the body by the snap-spring being less than the (12#) force of spring 113' but greater than the (4#) force of spring 109'.

When, in response to subsequent cooling of the space due to shut-off of the burner, the thermostat stem 72' retracts, closure 99' moves farther away from its seat 97' under the force of the spring-loaded pin 111' until this pin reaches its stopped position; this condition being indicated in Fig. 7.

When, upon farther retraction of the thermostat stem, the force applied through the body to the snap-spring is reduced to 7# the spring snaps back to its normal shape, opening valve 98', 100'. The resilience of disk 121' (which is made relatively thin) permits this snap action to occur regardless of the force of springs 113' and 109' resisting the slight, but essential, concurrent movement of body 130 toward the rear.

Because of the partially-open condition of the outlet valve 97', 99' when the inlet valve 98', 100' opens, the rate of flow of gas to the burner (through the restricted outlet 133 as well as through valve 97', 99') is such that lighting of the burner is ensured. In the actual embodiment of the invention referred to above, pin 111 is adjusted so that there is a space of about 0.003–0.004 inch between closure 99 and seat 97 when the snap-valve opens.

In order to effect partial opening of the outlet valve before or as the inlet valve opens, it would be possible to employ (in place of the two springs) a single relatively-stiff spring acting continuously between the body and the outlet closure in the manner of spring 109, but the arrangement shown is preferred because it permits accurate adjustment of the degree of partial-opening of the outlet closure.

Inasmuch as the valve assembly 68–70 virtually floats in cavity 67 between the thermostat and dial stems, the relative position of these stems could be reversed without materially affecting the operation of the assembly; but in the arrangement as shown no significant movement of the assembly, against the friction of sealing-rings 86, 87, is required (as would be required with reversal of the stems) during the modulating movements of the outlet closure.

By suitable rearrangement of the snap-action means and closure 100, 101 the inlet valve seat 98 could be faced in an opposite direction. If modulation of the high-fire were not desired, the outlet valve could be of the snap-action type so that fixed high-fire and low-fire operation, and shut-off, of the burner would be effected.

Other forms of the present invention are disclosed in my copending application Ser. No. 483,683, filed Jan. 24, 1955, and in the copending application of George P. Greenamyer, Ser. No. 509,856, filed May 20, 1955.

The specific embodiment of my invention herein shown and described is obviously susceptible of further modification without departing from the spirit of the invention, and I intend therefore to be limited only by the scope of the appended claims.

I claim as my invention:

1. In a valve structure: means defining an elongated chamber having in communication with its opposite ends an inlet and a main outlet; a pair of valves arranged in series in said chamber so that fluid must pass through both of the valves from said inlet to said main outlet, one of the valves being adjacent the main-outlet end of the chamber and the other adjacent the inlet end; said chamber having intermediate said valves a restricted outlet through which fluid can pass when said one of the valves is closed and said other of the valves is open; means, movable gradually in response to variation of a controlling condition, for actuating the valves in such sequence, while said condition is varying in a given sense, that said one of the valves is closed before the other of the valves is closed, and means arranged so that, when said condition subsequently varies in an opposite sense, said one of the valves is partially opened before said other of the valves is opened.

2. In a valve structure: means defining an elongated chamber having in communication with its opposite ends an inlet and a main outlet; a pair of valves arranged in series in said chamber so that fluid must pass through both of the valves from said inlet to said main outlet, one of the valves being adjacent the main-outlet end of the chamber and being of the type which comprises a closure positionable relative to a valve seat so as to vary and to obstruct flow, the other of the valves being adjacent the inlet end of the chamber and being of the snap-action type; said chamber having intermediate said valves a restricted outlet through which fluid can pass when said one of the valves is closed and said other of the valves is open; and means, movable gradually in response to variation of a controlling condition, for actuating the valves in such sequence, while said condition is varying in a given sense, that said one of the valves is closed before said other of the valves is closed.

3. A valve structure according to claim 2 and including means arranged so that, when said condition subsequently varies in an opposite sense, said one of the valves is partially opened before said other of the valves is opened.

4. In a valve structure: means defining an elongated and generally cylindrical chamber having, in communication with its opposite ends, an inlet and a main outlet; a pair of valves in said chamber and each actuatable in directions along the axis of the chamber, said valves being biased to open position and arranged in series so that fluid must pass through both of the valves from said inlet to said main outlet, one of the valves being adjacent the main-outlet end of the chamber and being of the type which comprises a closure positionable relative to a valve seat so as to vary and to obstruct flow, the other of the valves being adjacent the inlet end of the chamber; said chamber having intermediate said valves a restricted outlet through which fluid can pass when said one of the valves is closed and said other of the valves is open; means, including a member in said chamber movable gradually in directions along the axis of the chamber in response to variation of a controlling condition, adapted while said condition is varying in a given sense to apply force to said one of the valves so as to actuate it toward closed position against the force of its bias; and means so interconnecting the valves that continued movement of said member after said one of the valves is closed effects movement of said other of the valves to closed position.

5. A valve structure according to claim 4 wherein said means interconnecting the valves is arranged so that, when said condition subsequently varies in an opposite sense, said one of the valves is partially opened before said other of the valves is opened.

6. In a valve structure: a casing providing an elongated cylindrical cavity and having an inlet and a main outlet communicating with the opposite ends of said cavity; a member slidably fitting said cavity and having a through opening, said member providing around the opposite ends of said opening a first and a second valve seat adjacent, respectively, the main-outlet end and the inlet end of the cavity; a first closure in the main-outlet end of the cavity and movable in directions along the axis of the cavity into and out of engagement with said first seat and forming therewith a first valve; means, movable gradually in response to variation of a controlling condition, adapted while said condition is varying in a given sense to move said first closure into engagement with said first seat and, by continued movement, to move said member toward the inlet end of the cavity; resilient means resisting said movement of said member; a second closure adjacent the inlet end of the cavity and cooperable with said second seat to form therewith a second valve; and means for effecting closing of said second valve in said movement of said member toward the inlet end of the cavity; said member having intermediate said seats a transverse opening communicating with a restricted outlet in said casing so that fluid can pass from said inlet to the restricted outlet when said first valve is closed and said second valve is open.

7. A valve structure according to claim 6 wherein said means for effecting closing of said second valve comprises snap-action means.

8. A valve structure according to claim 6 wherein said means for effecting closing of said second valve is arranged so that, when said condition subsequently varies in an opposite sense, said first valve is opened partially before said second valve is opened.

9. In a valve structure: a casing providing an elongated cylindrical cavity and having an inlet and a main outlet communicating with the opposite ends of said cavity; a member slidably fitting said cavity and having a through opening, said member providing around the opposite ends of said opening a first and a second valve seat adjacent, respectively, the main-outlet end and the inlet end of the cavity; a first closure in the main-outlet end of the cavity, said first closure being in a general plane parallel to that of said first seat and cooperating therewith to form a first valve; first resilient means biasing said first valve to open position; a second closure adjacent the inlet end of the cavity, said second closure being in a general plane parallel to that of said second seat and cooperating therewith to form a second valve; second resilient means biasing said second valve to open position; and means, movable gradually along the axis of said cavity in response to variation of a controlling condition, adapted while said condition is varying in a given sense to apply operating force to said closures effecting such relative movement of the closures and said member as to close both of said valves, the force of said first resilient means resisting closing of said first valve being less than the corresponding force of said second resilient means so that the first valve is closed before the second valve is closed; said member having intermediate said seats a transverse opening communicating with a restricted outlet in said casing so that fluid can pass from said inlet to said restricted outlet when said first valve is closed and said second valve is open.

10. A valve structure according to claim 9 wherein said second resilient means is of the two-way snap-acting type.

11. A valve structure according to claim 9 wherein said second resilient means comprises a snap-spring of the type adapted to snap over-center from normal position under the operating force applied to said closures while said condition is varying in said given sense; said snap-spring being arranged so that it is capable of returning to said normal position only when, in subsequent variation of said condition in an opposite sense, said operating force is reduced to an amount less than the force of said first resilient means.

12. A valve structure according to claim 11 wherein said first resilient means consists of two springs, one of said springs being continuously effective, the other of the springs being arranged so that it is effective only when said first valve is in almost-closed condition.

13. A valve structure according to claim 12 wherein the force of the other of said two springs is greater than the force under which said snap-spring is capable of returning to normal position.

14. In a valve structure: a casing providing an elongated cylindrical cavity and having an inlet and a main outlet communicating with the opposite ends of said cavity; a member slidably fitting said cavity and having a through opening, said member providing around the opposite ends of said opening a first and a second valve seat facing, respectively, the main-outlet end and the inlet end of the cavity; a first closure in a general plane parallel to that of said first seat and spaced therefrom in a direction toward the main-outlet end of the cavity, first resilient means biasing said first closure away from said first seat, said first closure cooperating with said first seat to form a first valve; a second closure in a general plane parallel to that of said second seat and spaced therefrom in a direction toward the inlet end of the cavity, second resilient means biasing said second closure away from said second seat, said second closure cooperating with said second seat to form a second valve; and means, movable gradually along the axis of said cavity in response to variation of a controlling condition, adapted while said condition is varying in a given sense to apply operating force to the opposite ends of said closures effecting such relative movement of the closures and said member as to close both of said valves, the force of said first resilient means resisting closing of said first valve being less than the corresponding force of said second resilient means so that the first valve is closed before the second valve is closed; said member having intermediate said seats a transverse opening communicating with a restricted outlet in said casing so that fluid can pass from said inlet to said restricted outlet when said first valve is closed and said second valve is open.

15. A valve structure according to claim 14 wherein said second resilient means comprises a snap-spring of the type adapted to snap over-center from normal position under the operating force applied to said closures while said condition is varying in said given sense; said snap-spring being arranged so that it is capable of returning to said normal position only when, in subsequent variation of said condition in an opposite sense, said operating force is reduced to an amount less than the force of said first resilient means.

16. A valve structure according to claim 15 wherein said first resilient means consists of two springs, one of said springs being continuously effective, the other of the springs being arranged so that it is effective only when said first valve is in almost-closed condition; and further wherein the force of the other of said two springs is greater than the force under which said snap-spring is capable of returning to normal position.

17. In a valve structure: a casing providing an elongated cylindrical cavity and having an inlet and a main outlet communicating with the opposite ends of said cavity; a member slidably and sealingly fitting said cavity and having a through opening, said member providing around the opposite ends of said opening a first and a second valve seat facing, respectively, the main-outlet end and the inlet end of the cavity; a first closure in a general plane parallel to that of said first seat and spaced therefrom in a direction toward the main-outlet end of the cavity, first resilient means acting between said member and said first closure and biasing the first closure away from said first seat, said first closure cooperating with said first seat to form a first valve; a second closure in a general plane parallel to that of said second seat and spaced therefrom in a direction toward the inlet end of the cavity, second resilient means acting between said member and said second closure and biasing the second closure away from said second seat, said second closure cooperating with said second seat to form a second valve; the force of said second resilient means being greater than that of said first resilient means; means, including means fixed relative to said casing, preventing movement of said second closure in a direction toward said inlet end of the cavity; and means, movable gradually along the axis of the cavity in response to variation of a controlling condition, adapted while said condition is varying in a given sense to apply operating force to said first closure to move the same into engagement with said first seat and, by continued movement, to slide said member in a direction toward the inlet end of the cavity against the force of said second resilient means to effect interengagement of said second seat and said second closure; said member having intermediate said seats a transverse opening communicating with a restricted outlet in the casing so that fluid can pass from said inlet to said restricted outlet when said first valve is closed and said second valve is open.

18. A valve structure according to claim 17 wherein said second resilient means comprises a snap-spring of the type adapted to snap over-center from normal position under the operating force applied to said member through said first closure while said condition is varying in said given sense; said snap-spring being arranged so that it is capable of returning to said normal position only when, in subsequent variation of said condition in an opposite sense, said operating force is reduced to an amount less than the force of said first resilient means.

19. A valve structure according to claim 18 wherein said first resilient means consists of two springs, one of said springs being continuously effective, the other of the springs being arranged so that it is effective only when said first valve valve is in almost-closed condition; and further wherein the force of the other of said two springs is greater than the force under which said snap-spring is capable of returning to normal position.

References Cited in the file of this patent

UNITED STATES PATENTS

| | | |
|---|---|---|
| 1,240,835 | Frank | Sept. 25, 1917 |
| 1,957,082 | Schneible | May 1, 1934 |
| 2,056,550 | Wild | Oct. 6, 1936 |

Disclaimer and Dedication 2,766,773.—*Richard D. Grayson*, La Canada, Calif. VALVE STRUCTURE.
Patent dated Oct. 16, 1956. Disclaimer and dedication filed Aug. 19,
1957, by the assignee, *General Controls Co.*; the inventor consenting.

Hereby enters this disclaimer to claim 2 of said patent, and dedicates to the public that portion of the terminal part of the term of said patent subsequent to Apr. 10, 1973.

[*Official Gazette September 24, 1957.*]